US008502926B2

(12) United States Patent
Bilbrey

(10) Patent No.: US 8,502,926 B2
(45) Date of Patent: Aug. 6, 2013

(54) DISPLAY SYSTEM HAVING COHERENT AND INCOHERENT LIGHT SOURCES

(75) Inventor: Brett Bilbrey, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 751 days.

(21) Appl. No.: 12/570,120

(22) Filed: Sep. 30, 2009

(65) Prior Publication Data
US 2011/0075055 A1    Mar. 31, 2011

(51) Int. Cl.
*H04N 9/31* (2006.01)

(52) U.S. Cl.
USPC ............................................................. 348/744

(58) Field of Classification Search
USPC .......... 348/744, 759, 739, 770–771; 359/263, 359/634, 636; 353/31, 29
See application file for complete search history.

(56) References Cited

U.S. PATENT DOCUMENTS

| 3,363,104 | A |   | 1/1968 | Waite et al. | |
|---|---|---|---|---|---|
| 3,761,947 | A |   | 9/1973 | Volkmann et al. | |
| 4,620,222 | A |   | 10/1986 | Baba et al. | |
| 5,272,473 | A |   | 12/1993 | Thompson et al. | |
| 5,274,494 | A |   | 12/1993 | Rafanelli et al. | |
| 5,337,081 | A |   | 8/1994 | Kamiya et al. | |
| 5,671,085 | A | * | 9/1997 | Gustafsson et al. | 359/385 |
| 5,757,423 | A |   | 5/1998 | Tanaka et al. | |
| 6,282,655 | B1 |   | 8/2001 | Given | |
| 6,304,263 | B1 | * | 10/2001 | Chiabrera et al. | 345/419 |
| 6,310,662 | B1 |   | 10/2001 | Sunakawa et al. | |
| 6,329,963 | B1 | * | 12/2001 | Chiabrera et al. | 345/6 |
| 6,339,429 | B1 |   | 1/2002 | Schug | |
| 6,389,153 | B1 |   | 5/2002 | Imai et al. | |
| 6,416,186 | B1 |   | 7/2002 | Nakamura | |
| 6,426,781 | B1 | * | 7/2002 | Lee | 348/754 |
| 6,516,151 | B2 |   | 2/2003 | Pilu | |
| 6,560,711 | B1 |   | 5/2003 | Given et al. | |
| 6,561,654 | B2 |   | 5/2003 | Mukawa et al. | |
| 6,636,292 | B2 |   | 10/2003 | Roddy et al. | |
| 6,738,105 | B1 | * | 5/2004 | Hannah et al. | 348/745 |
| 6,807,010 | B2 |   | 10/2004 | Kowarz | |
| 6,819,469 | B1 | * | 11/2004 | Koba | 359/290 |
| 6,862,022 | B2 |   | 3/2005 | Slupe | |
| 6,877,863 | B2 |   | 4/2005 | Wood et al. | |
| 6,903,880 | B2 |   | 6/2005 | Beatson et al. | |
| 6,921,172 | B2 |   | 7/2005 | Ulichney et al. | |

(Continued)

FOREIGN PATENT DOCUMENTS

| EP | 167314 | 1/1986 |
|---|---|---|
| EP | 2053844 | 4/2009 |

(Continued)

OTHER PUBLICATIONS

Author Unknown, "YCbCr," http://en.wikipedia.org/wiki/Y%27CbCr, 4 pages, at least as early as Jun. 17, 2010.

(Continued)

*Primary Examiner* — Paulos M Natnael
(74) *Attorney, Agent, or Firm* — Louis R. Levenson

(57) ABSTRACT

Embodiments are disclosed that allow light display systems, such as projectors, to be manufactured having lower power consumption, reduced speckling, and/or that are less expensive than conventional light projectors. In some embodiments, may include an incoherent light source and a coherent light source operating in concert with one another to produce a combined light beam that has similar wavelength contributions from the incoherent and coherent light sources.

8 Claims, 7 Drawing Sheets

U.S. PATENT DOCUMENTS

| | | | |
|---|---|---|---|
| 6,924,909 B2 | 8/2005 | Lee et al. | |
| 6,930,669 B2 | 8/2005 | Weiner et al. | |
| 6,931,601 B2 | 8/2005 | Vronay et al. | |
| 6,970,080 B1 | 11/2005 | Crouch et al. | |
| 7,028,269 B1 | 4/2006 | Cohen-Solal et al. | |
| 7,058,234 B2 | 6/2006 | Gindele et al. | |
| 7,079,707 B2 | 7/2006 | Baron | |
| 7,119,936 B2 * | 10/2006 | Kowarz et al. | 359/207.1 |
| 7,123,298 B2 | 10/2006 | Schroeder et al. | |
| 7,215,383 B2 * | 5/2007 | Hannah et al. | 348/615 |
| 7,307,709 B2 | 12/2007 | Lin et al. | |
| 7,352,913 B2 | 4/2008 | Karuta et al. | |
| 7,370,336 B2 | 5/2008 | Husain et al. | |
| 7,413,311 B2 | 8/2008 | Govorkov et al. | |
| 7,426,021 B2 * | 9/2008 | Cyr | 356/73.1 |
| 7,453,510 B2 | 11/2008 | Kolehmainen et al. | |
| 7,460,179 B2 | 12/2008 | Pate et al. | |
| 7,486,339 B2 * | 2/2009 | Belliveau | 348/744 |
| 7,512,262 B2 | 3/2009 | Criminisi et al. | |
| 7,551,771 B2 | 6/2009 | England | |
| 7,570,881 B2 | 8/2009 | Perala et al. | |
| 7,590,335 B2 | 9/2009 | Kobayashi et al. | |
| 7,590,992 B2 | 9/2009 | Koplar et al. | |
| 7,598,980 B2 | 10/2009 | Imai et al. | |
| 7,613,389 B2 | 11/2009 | Suzuki et al. | |
| 7,629,897 B2 | 12/2009 | Koljonen | |
| 7,641,348 B2 | 1/2010 | Yin et al. | |
| 7,653,304 B2 | 1/2010 | Nozaki et al. | |
| 7,658,498 B2 | 2/2010 | Anson | |
| 7,697,188 B2 * | 4/2010 | Maeda et al. | 359/263 |
| 7,830,357 B2 * | 11/2010 | Kitaoka et al. | 345/102 |
| 7,834,846 B1 | 11/2010 | Bell | |
| 7,869,204 B2 | 1/2011 | Bair et al. | |
| 7,901,084 B2 | 3/2011 | Willey et al. | |
| 7,964,835 B2 | 6/2011 | Olsen et al. | |
| 8,044,880 B2 | 10/2011 | Nakamura et al. | |
| 2002/0021288 A1 | 2/2002 | Schug | |
| 2003/0038927 A1 | 2/2003 | Alden | |
| 2003/0086013 A1 | 5/2003 | Aratani | |
| 2003/0117343 A1 | 6/2003 | King | |
| 2004/0090679 A1 | 5/2004 | Kowarz | |
| 2004/0193413 A1 | 9/2004 | Wilson et al. | |
| 2005/0132408 A1 | 6/2005 | Dahley et al. | |
| 2005/0168583 A1 | 8/2005 | Thomason | |
| 2005/0182962 A1 | 8/2005 | Given et al. | |
| 2005/0280786 A1 | 12/2005 | Moiroux et al. | |
| 2006/0140452 A1 | 6/2006 | Raynor et al. | |
| 2006/0197843 A1 | 9/2006 | Yoshimatsu | |
| 2007/0027580 A1 | 2/2007 | Ligtenberg et al. | |
| 2007/0177279 A1 | 8/2007 | Cho et al. | |
| 2007/0236485 A1 | 10/2007 | Trepte | |
| 2007/0300312 A1 | 12/2007 | Chitsaz et al. | |
| 2008/0062164 A1 | 3/2008 | Bassi et al. | |
| 2008/0131107 A1 | 6/2008 | Ueno | |
| 2008/0158362 A1 | 7/2008 | Butterworth | |
| 2008/0191864 A1 | 8/2008 | Wolfson | |
| 2009/0008683 A1 | 1/2009 | Nishizawa | |
| 2009/0027337 A1 | 1/2009 | Hildreth | |
| 2009/0051797 A1 | 2/2009 | Yao | |
| 2009/0115915 A1 | 5/2009 | Steinberg et al. | |
| 2009/0221368 A1 | 9/2009 | Yen et al. | |
| 2009/0262306 A1 | 10/2009 | Quinn et al. | |
| 2009/0262343 A1 | 10/2009 | Archibald | |
| 2009/0273679 A1 | 11/2009 | Gere et al. | |
| 2009/0309826 A1 | 12/2009 | Jung et al. | |
| 2010/0060803 A1 | 3/2010 | Slack et al. | |
| 2010/0061659 A1 | 3/2010 | Slack et al. | |
| 2010/0073499 A1 | 3/2010 | Gere et al. | |
| 2010/0079426 A1 | 4/2010 | Pance et al. | |
| 2010/0079468 A1 | 4/2010 | Pance et al. | |
| 2010/0079653 A1 | 4/2010 | Pance | |
| 2010/0079884 A1 | 4/2010 | Gere et al. | |
| 2010/0083188 A1 | 4/2010 | Pance et al. | |
| 2010/0103172 A1 | 4/2010 | Purdy | |
| 2010/0142014 A1 * | 6/2010 | Rosen et al. | 359/1 |
| 2011/0074931 A1 | 3/2011 | Bilbrey et al. | |
| 2011/0115964 A1 | 5/2011 | Gere | |
| 2011/0149094 A1 | 6/2011 | Chen et al. | |
| 2012/0044328 A1 | 2/2012 | Gere | |
| 2012/0076363 A1 | 3/2012 | Kessler et al. | |

FOREIGN PATENT DOCUMENTS

| | | |
|---|---|---|
| JP | 2002354493 | 12/2002 |
| WO | WO 93/11631 | 6/1993 |
| WO | WO 2007/100057 | 9/2007 |
| WO | WO 2009/001512 | 12/2008 |

OTHER PUBLICATIONS

Koschan et al., "Finding Objects in a 3D Environment by Combining Distance Measurement and Color Indexing," IEEE, vol. 1, pp. 858-861, Oct. 2001.

Sokolova et al., "Experiments in Stereo Vision," Computer Science 570, Final Project, http://disparity.wikidot.com/, 14 pages, at least as early as Jun. 16, 2010.

International Search Report, PCT/US2010/054667, 4 pages, Feb. 4, 2011.

International Search Report and Written Opinion, PCT/US2011/044418, 19 pages, Jan. 31, 2012.

* cited by examiner

DISPLAY SYSTEM HAVING COHERENT AND INCOHERENT LIGHT SOURCES

BACKGROUND OF THE INVENTION

I. Technical Field

The present invention relates generally to display systems, and more particularly to methods and apparatuses that provide coherent and incoherent lighting sources within the same display system.

II. Background Discussion

Electronic devices are ubiquitous in society and can be found in everything from wristwatches to computers. Many of these electronic devices include the ability to display images to the user of the electronic device, such as by projecting the displayed images through a lens onto a screen or backdrop. Conventional projectors include so called "laser projectors," which render images using coherent laser light as opposed to projectors using incoherent incandescent light sources. While the laser display systems may offer greater resolution than non-laser based display systems, they often consume greater amounts of power. Because of their greater power consumption requirements, laser based display systems also may include complicated cooling circuitry and thus result in more bulky projection equipment.

Another issue with laser display systems versus non-laser based display systems is the so called "speckle" problem. "Speckling" refers to an interference in the intensity of highly coherent light, such as laser light, which may result from the laser striking a rough surface. The overall effect of speckle in laser display systems is that the image may appear grainy. Furthermore, laser light sources are often more costly than other non-laser light sources, making laser based display systems more expensive. Accordingly, display systems that embrace the desirable features of laser light sources while overcoming the undesirable features of non-laser light sources may be useful.

SUMMARY

Embodiments are disclosed that allow light display systems, such as projectors, to have lower power consumption, reduced speckling, and/or that are less expensive than conventional light projectors. In some embodiments, an incoherent light source may be optically coupled to a coherent light source to produce a combined coherent and incoherent beam of light for projecting images. In general, incoherent light sources, such as light emitting diodes (LEDs) or incandescent bulbs, emanate light waves across a broad spectrum (e.g., multiple wavelengths of light), whereas coherent light sources, such as lasers, are more precise and emanate light waves of a single wavelength. By combining light from the incoherent light source with the light from the coherent light source, the overall power level of the coherent light source in the combined light beam may be reduced while still perceiving a crisp, clear image. As a result of the lower power levels for the coherent light sources, the size and complexity of light projection systems may be reduced.

Some embodiments may take the form of a system for displaying images, wherein the system includes an incoherent light source and a coherent light source operating in concert with the incoherent light source to produce a combined beam of light, where the combined light beam includes similar wavelength contributions from the incoherent and coherent light sources. The term "operation in concert" as used herein is intended to refer to the coherent and incoherent light sources emanating at least one wavelength that is substantially the same at substantially the same time.

Other embodiments may take the form of a method of calibrating an image display system, wherein the method includes the operations of providing an image to one or more display circuits, setting a first intensity level for an incoherent light source, determining if an intensity of the projected image equals a desired intensity level, and, in the event that the intensity of the projected image does not equal the desired intensity, setting a second intensity level for a coherent light source.

Still another embodiment may be a method of projecting an image, wherein the method includes separating an image into first and second components, projecting the first component using an incoherent light source, and projecting the second component using a coherent light source, wherein the incoherent and the coherent sources concurrently generate similar wavelengths to render the image.

BRIEF DESCRIPTION OF THE DRAWINGS

The use of the same reference numerals in different drawings indicates similar or identical items.

DETAILED DESCRIPTION OF THE INVENTION

Although one or more of the embodiments disclosed herein may be described in detail with reference to a particular electronic device, the embodiments disclosed should not be interpreted or otherwise used as limiting the scope of the disclosure, including the claims. In addition, one skilled in the art will understand that the following description has broad application. For example, while the embodiments disclosed below may be focused on projecting images on a screen, other embodiments are possible that do not utilize a screen, such as holographic projection equipment. Accordingly, the discussion of any embodiment is meant only to be exemplary and is not intended to suggest that the scope of the disclosure, including the claims, is limited to these embodiments.

Figure 1:
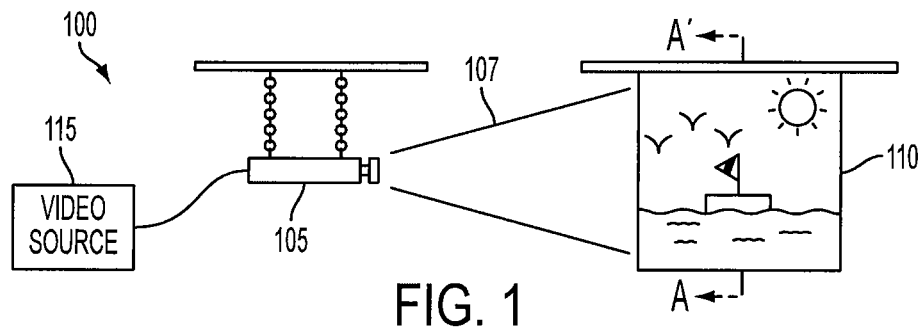
FIG. 1 illustrates one embodiment of a display system.

FIG. 1 illustrates a display system 100 that may include a projector 105 capable of emanating a combined beam 107 of coherent and incoherent light onto a screen 110.

In some embodiments, the projector 105 and the screen 110 may be secured in a single location. For example, as shown in FIG. 1, the projector 105 and the screen 110 may be secured to the roof. Alternatively, in other embodiments (not specifically shown), the projector 105 may be part of a portable display system such that both the projector 105 and the screen 110 may be relocated if desired. Furthermore, while some of the embodiments discussed herein may employ a screen 110, it should be appreciated that the screen's 110 use is optional and that the projector 105 may be situated to project the combined beam 107 onto any surface, whether flat or curved. Also, while the screen 110 depicted herein is shown as forward projecting, the screen 110 may be translucent and allow for rear projection in other embodiments. In a rear projection system, the screen 110 may be made of plastic or glass, such as in a rear projection television. In still other embodiments, the screen 110 may be omitted altogether and the combined beam 107 may be projected onto any surface, such as a wall, or such as air in the case of holographic systems.

As shown in FIG. 1, the projector 105 may couple to a video source 115 that is capable of generating image signals according to a variety of standards, both moving (e.g., ATSC, DVB, NTSC, PAL, SECAM, MPEG-4, etc.) and stationary (e.g., JPEG, TIFF, PNG, GIF, etc.), and then providing multiple component video signals associated with these image signals to the projector 105. The component video signals may be a plurality of components of any desirable color space, such as red, green, blue (RGB), luminance, luminance minus red, and luminance minus blue (Y, Pr, Pb), cyan, magenta, yellow, and black (CMYK), CIELAB and/or CIEXYZ, and so on.

Figure 2:
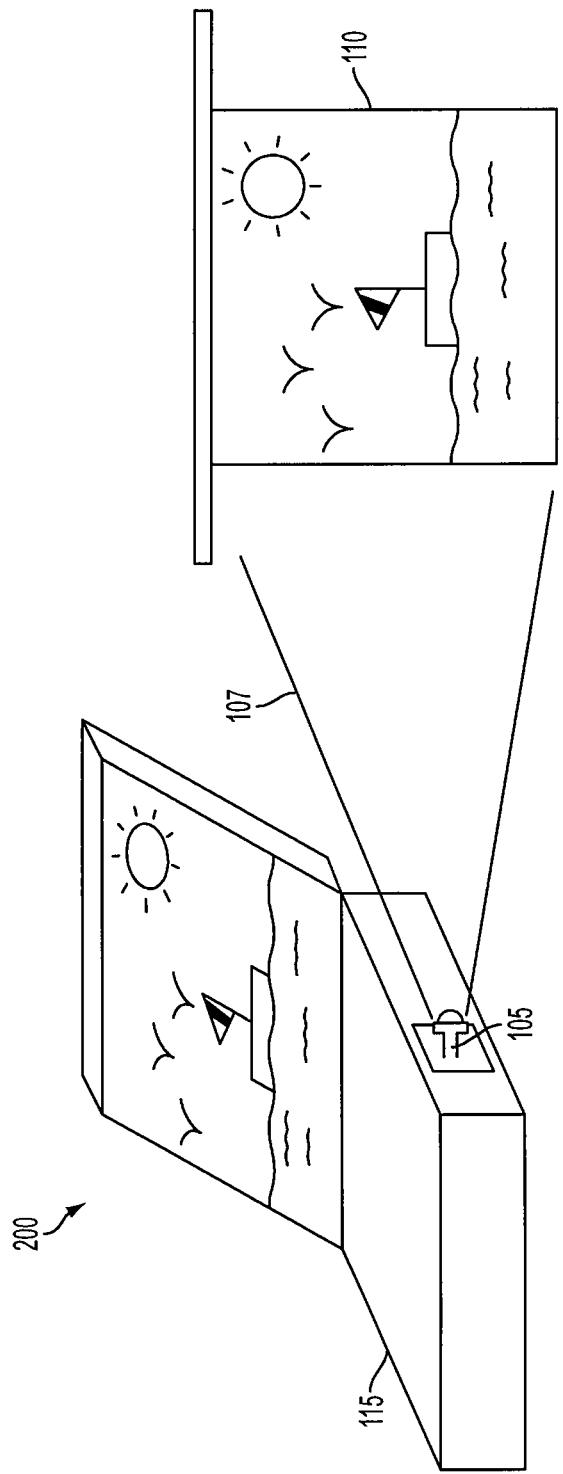
FIG. 2 illustrates an alternate embodiment of the display system.

Depending upon the chosen embodiment, the video source 115 and/or display system 100 may take on a variety of different forms. For example, as shown in FIG. 1, the video source 115 may be a separate computer and the display system 100 and the video source powered from a separate source, such as an A/C wall outlet. However, in other embodiments, the projector 105 and the video source 115 may be integrated together in a single housing and operates off of a portable battery. For example, FIG. 2 illustrates one embodiment where the video source 115 and projector 105 are integrated within a laptop computer 200. Since the projector 105 is capable of providing a combined beam 107 at reduced power levels as compared to conventional coherent beam systems, such an embodiment may be desirable in a laptop computer 200 being powered from a battery, such as is in the commonly owned U.S. patent application Ser. Nos. 12/238,633 and 12/238,564, which are incorporated herein by reference as if fully set forth below. Other portable embodiments are also possible. For example, the video system 115 and the projector 105 also may be incorporated into a portable phone or other handheld device.

Figure 3:
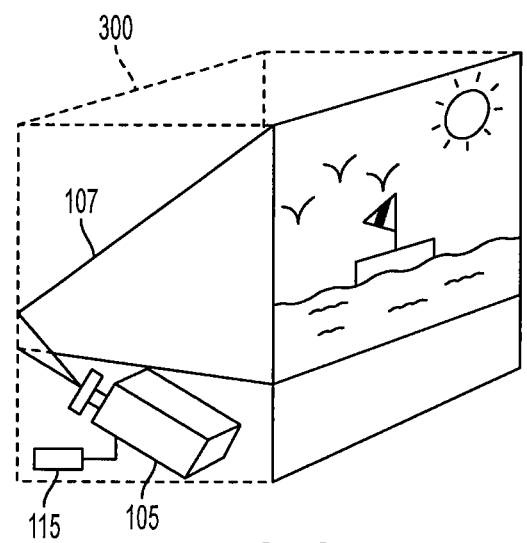
FIG. 3 illustrates yet another alternate embodiment of the display system.

In still other embodiments, such as the embodiment shown in FIG. 3, the video source 115 may be a television signal receiver and the projector 105 may be used in a rear projection television 300. As will be described in greater detail below, display systems, such as the television 300, which operate the incoherent and coherent light sources in concert to render images with the combined beam 107 may be smaller and less bulky than televisions 300 that are based solely on coherent light sources because of the reduced need for power management circuitry.

Figure 4:
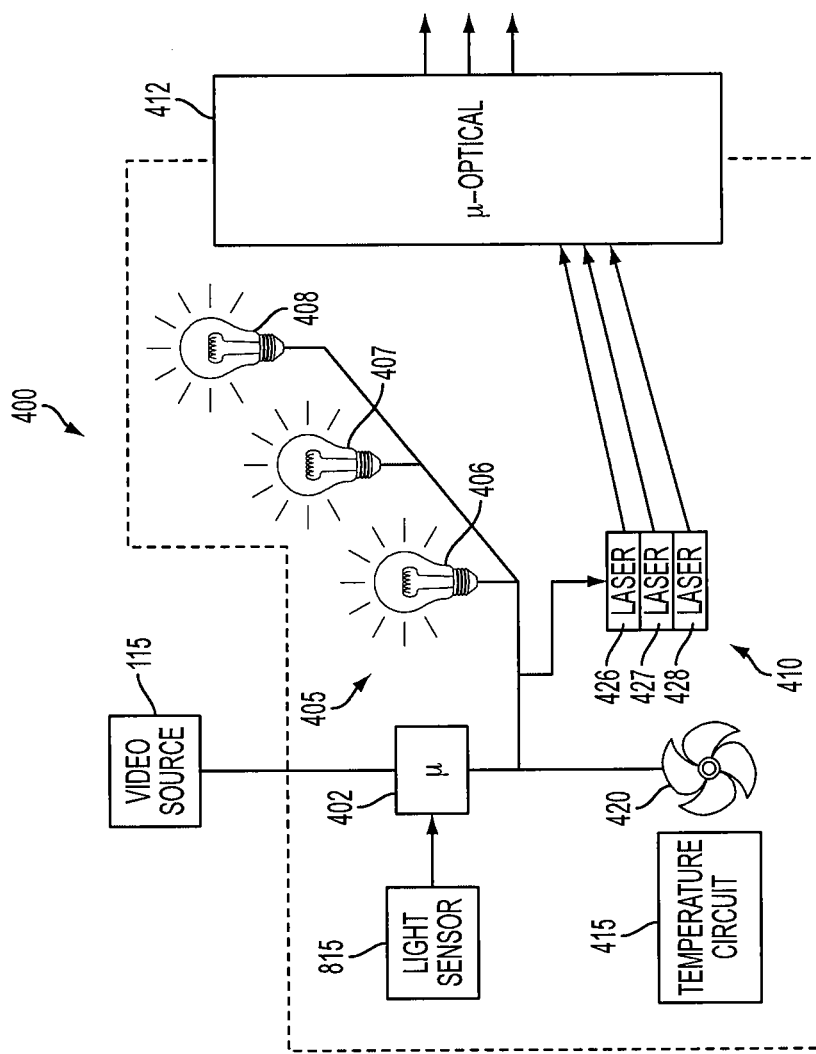
FIG. 4 illustrates a display system employing incoherent and coherent light sources.

Regardless of the particular implementation of the video source 115, during operation, the video source 115 may provide one or more of the component video signals (e.g., one or more of the RGB signals) as video data to a network of components within the projector 105. FIG. 4 illustrates one embodiment showing a set of internal components 400. The set of internal components 400 may exist within a common housing (as indicated by the dashed line in FIG. 4), or alternatively, one or more of the components within the set of internal components 400 may exist in the housing of another device, such as the video source 115.

As shown, the network 400 may include a microprocessor 402 coupled to the video source 115. The microprocessor 402 may further couple to an incoherent light source 405 and a coherent light source 410. When connected together in this manner, the microprocessor 402 may receive video data from the video source 115, and convert this video data to a format that is suitable for display by the incoherent and coherent light sources 405 and 410.

Figure 5:
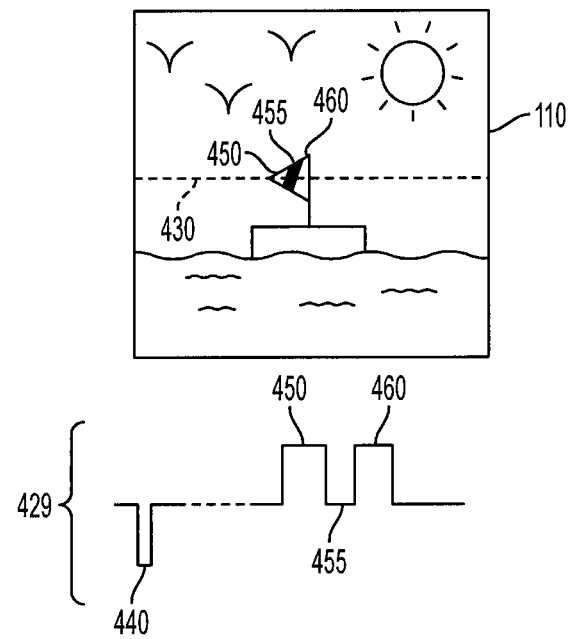
FIG. 5 illustrates signals that may be conveyed to the incoherent and coherent light sources.

In some embodiments, images may be rendered on the screen 110 by driving the incoherent and coherent light sources 405 and 410 on a successive line-by-line basis. FIG. 5 illustrates a signal 429 that may be used by the microprocessor 402 driving the incoherent and coherent light sources 405 and 410 when rendering a line 430 of the image on the screen 110. As shown, the signal driving the incoherent and coherent light sources 405 and 410 may include a synchronization pulse 440 corresponding to the beginning of a scan line. For purposes of discussion, the synchronization pulse 440 is discussed in the context of beginning each image scan line 430 on the left side of the screen 110, although it could begin at the right, top or bottom of the screen 110 instead. As the line 430 is scanned across to render the image, it may output different regions, such as the transition regions 450, 455, and 460 of the sail in the image where the color content of the image may change between the transition regions 450, 455, and 460. In this example, the regions 450 and 460 may correspond to a white region of the image, while the region 455 may correspond to a colored region of the image, such as red, blue or black. The signal 429 includes portions 450, 455, and 460 that correspond to these changes in color content respectively. As shown, during the white regions 450 and 460 the signal 429 may be high, thereby emanating white light from the incoherent and coherent light sources 405 and 410 onto the screen 110, whereas during the colored region 455 the signal 429 may be lower than the regions 450 and 460, thereby emitting less light from the incoherent and coherent light sources 405 and 410, which may result in colored regions on the screen 110, such as red, blue, or black. In some embodiments, the incoherent and coherent light sources 405 and 410 may be driven by different portions of the video signals, or different axes of a color space, to render different portions of the image. For example, the incoherent light source 405 may be driven by the luminance portion of the video signal while the coherent light source 410 may be driven by the chrominance portion of the video signal.

Referring back to FIG. 4, the incoherent and coherent light sources 405, 410 may be optically coupled to a network of optical elements 412 capable of modifying and/or combining incoming light from the incoherent and coherent light sources 405 and 410. For example, in some embodiments, the network 412 may include digital mirror devices and/or lenses, servos, filters, modulators, to name but a few. During operation, the network 412 may optically combine and condition the light emanating from the incoherent and coherent light sources 405 and 410 and convey the combined coherent and incoherent light to the screen 110.

The set of internal components 400 may include a temperature monitoring circuit 415 that is under control of the microprocessor 402 and able to track changes in one or more of the set of internal components 400 over time. In some embodiments the temperature monitoring circuit 415 may be one or more silicon based diodes (not shown), which may have a temperature coefficient of approximately negative two millivolts per degree Celsius. Depending upon the embodiment, these diodes may be located adjacent to one or more elements within the set of internal components 400. As the temperature of the temperature monitoring circuit 415 increases, the voltage across these diodes may decrease. Similarly, as the temperature of the temperature monitoring circuit 415 decreases, the voltage across these diodes may increase.

The microprocessor 402 may monitor this changing voltage and compare it to a desired operating temperature for the various elements in the set of internal components 400 and adjust the temperature of the set of internal components via one or more thermal management devices. For example, FIG. 4 illustrates a fan 420 that may cool the incoherent and coherent light sources 405 and 410 under the control of the microprocessor 402. In other embodiments, the thermal management devices also may include a passive heat sink or an active Pelletier cooler thermally coupled to the incoherent and coherent light sources 405 and 410. As will be described in greater detail below, because the projector 105 may utilize both incoherent and coherent light sources 405 and 410, the overall amount of power dissipated by the projector 105 may be less than it otherwise would be if the projector 105 used solely coherent light sources. Accordingly, the need for multiple thermal management devices, such as both a fan and a Pelletier cooler, may be reduced, making the projector 105 more cost efficient and/or consume less space than if the projector 105 utilized solely coherent light sources.

As mentioned previously, incoherent light sources emit light waves that have multiple wavelengths of light, whereas coherent light sources generally are more precise and emit light waves that have a single wavelength of light. For example, an incoherent light source may be implemented with one or more white incandescent bulbs that emanate light with multiple different wavelengths simultaneously. In some embodiments, the incoherent light source may be an incandescent bulb of a particular color where the glass portion of the bulb acts as a filter to the emanating light waves and filters out all but a range of desired wavelengths. For example, as shown in FIG. 4, the light source 405 may include three separate incandescent bulbs 406, 407, and 408 configured as red, green, and blue light sources, respectively, such that the light emanating from the bulbs 406, 407, and 408 is in the range of wavelengths associated with red, green, and blue light. In other words, the bulb 406 may be associated with a red wavelength of about 650 nanometers as well as a range of about +/−10% about this wavelength. Similarly, the bulb 407 may be associated with a blue wavelength of about 475 nanometers as well as a range of wavelengths of about +/−10% of this wavelength. Lastly, the bulb 408 may be associated with a green wavelength of about 510 nanometers as well as a range of wavelengths of about +/−10% of this wavelength.

Other embodiments may implement the incoherent light sources 406, 407, and 408 using individual incoherent light sources that emanate a more narrow range of wavelengths, such as by using an LED of a particular color. For example, when implementing the incoherent light source 406 using a red LED having the same 650 nanometer red wavelength noted above for the bulb embodiment, the LED based incoherent source 406 may have a range of wavelengths that is much more narrow than the +/−10% noted above. For example, the range of wavelengths emitted by a sample LED may be about +/−1% of the 650 nanometer wavelength While the incoherent light source 405 may emanate multiple different wavelengths within a range of wavelengths, the coherent light source 410 may emanate single wavelengths of light, or in some embodiments, a much more narrow range of wavelengths than the incoherent light source 405. For example, the coherent light source 410 may be implemented as one or more laser-based light sources that are tuned to emanate a single wavelength of light or multiple wavelengths. In this manner, the coherent light source 410 may include lasers 426, 427, and 428 associated with the primary colors red, green, and blue respectively, where the wavelengths of the lasers are chosen such that they substantially match the desired wavelengths of the incoherent sources. Thus, if the incoherent red light source 406 is chosen with a 650 nanometer wavelength with a range of wavelengths of +/−10% around the 650 nanometer wavelength, then the laser 426 may be chosen such that it emanates a single wavelength of light at about 650 nanometers. Similarly, the lasers 427 and 428 may be chosen to emanate single wavelengths of blue and green light corresponding to the incoherent light sources 407 and 408, or single wavelengths of about 475 and 510 nanometers, respectively.

It should be appreciated that although this disclosure may discuss the incoherent light source 405 and the coherent light source 410 as comprising multiple individual light sources, either one or both of the incoherent and coherent light sources 405 and 410 may be implemented as a single light source and such single source may operate in concert with one another. For example, instead of implementing the incoherent light source 405 with three separate light sources 406, 407 and 408 as shown in FIG. 4, the incoherent light source 405 may be implemented as a single incoherent light source that operates in concert with one or more of the coherent light sources 426, 427, and/or 428. Similarly, instead of implementing the coherent light source 410 with three separate light sources 426, 427 and 429, the coherent light source 410 may be implemented as a single coherent light source that operates in concert with one or more of the incoherent light sources 406, 407, and/or 408.

During operation, the microprocessor 402 may receive video data from the video source 115 and drive video signals to the incoherent light source 405 while concurrently driving video signals to the coherent light source 410. In other words, each of the individual incoherent light sources 406, 407, and 408 may operate in concert with each of the individual coherent light sources 426, 427, and 428.

Figure 6A:
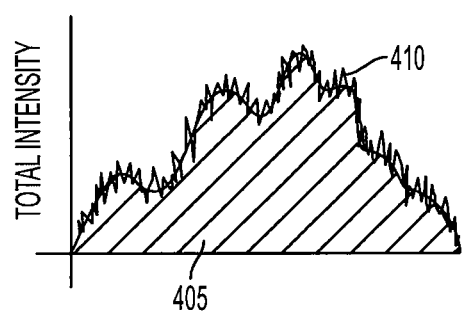
FIG. 6A illustrates the overall intensity of the combination of the incoherent and coherent light sources.
Figure 6B:
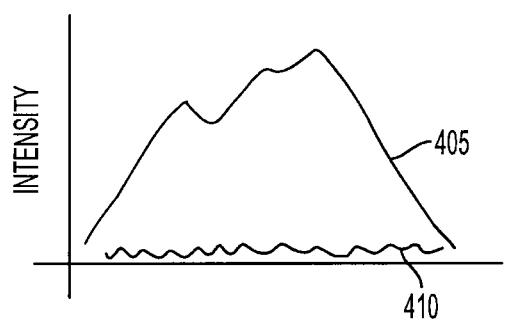
FIG. 6B illustrates an alternate representation of the intensity of the incoherent and coherent light sources.
Figure 6C:
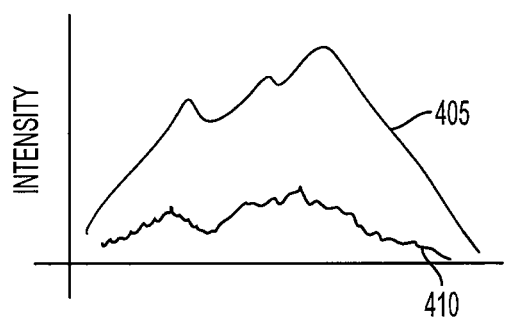
FIG. 6C illustrates yet another representation of the intensity of the incoherent and coherent light sources.

FIG. 6A illustrates an example of the combined intensity of the incoherent light sources 406, 407, and 408 in concert with the coherent light sources 426, 427, and 428. Referring to FIG. 6A, the coincident horizontal position of the combined light sources 405 and 410 is illustrated on the abscissa axis and the overall intensity of the combined light sources 405 and 410 is illustrated on the ordinate axis. The intensity representation of the combined light sources 405 and 410 may represent any of the individual incoherent and coherent light sources 405 and 410 operating in concert with each other. For example, the overall intensity shown in FIG. 6A may represent the incoherent red light source 406 shown in FIG. 4 operating in concert with the coherent red light source 426 shown in FIG. 4. FIGS. 6B and 6C illustrate alternative arrangements of operating the individual incoherent and coherent light sources 405 and 410 in concert with each other. Referring to the example shown in FIG. 6B, this representation illustrates a baseline chrominance portion of the image on the coherent light source 410 while the incoherent light source 405 includes a modulated version of the chrominance in combination with the luminance portion of the image. Referring to the example shown in FIG. 6C, this representation illustrates a modulated chrominance portion of the image on the coherent light source 410 where this modulated portion of complements the modulated version of the chrominance and luminance portions of the image as rendered by the incoherent light source 405. Although FIGS. 6A-C illustrate various arrangements for operating the incoherent and coherent light sources 405 and 410 to display an image, the methods shown in FIGS. 6A-C are for illustrative purposes, and the actual configurations may vary between embodiments.

The shaded area beneath the intensity curve shown in FIG. 6 represents the incoherent light source 405. As can be appreciated from inspection of FIG. 6, a majority of the overall intensity of the light rendered on the screen 110 may be from the incoherent light source 405, and as shown by the serrated line in FIG. 6, the coherent light source 410 may be superimposed on the light from the incoherent light source 405 in order to fine tune the intensity of the image rendered on the screen 110. Coherent light sources generally are able to render images with greater detail than the incoherent light sources at the expense of operating at higher power levels than the incoherent light sources. Thus, the incoherent light source 405 may operate to establish a baseline intensity for the image. This baseline intensity may consume less power as compared to establishing this intensity level with the coherent light source 410 alone. However, since this baseline intensity is established with the incoherent light source 405, its precision may not be as fine as if the coherent light source 410 were used to render the image alone. Accordingly, the coherent light source 410 may be operated at a lower power and/or intensity level (shown in FIG. 6 by the relatively small excursions of the serrated edges) and then superimposed on top of the baseline set by the incoherent light source 405 to improve the resolution of the image.

Figure 7A:
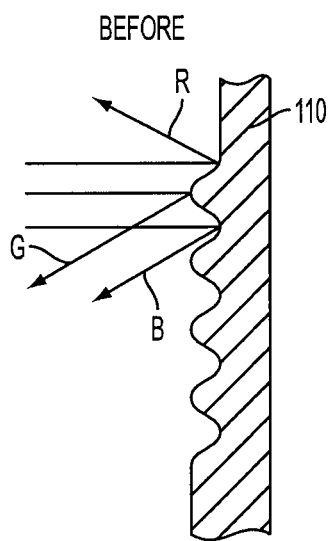
FIG. 7A illustrates speckle with respect to coherent light sources.
Figure 7B:
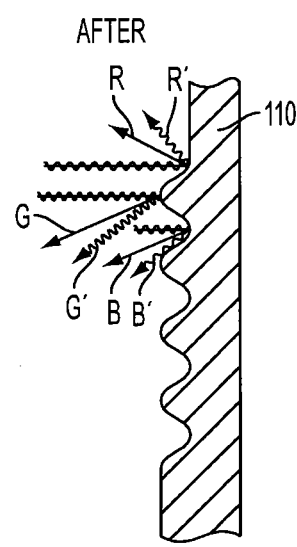
FIG. 7B illustrates speckle reduction as a result of employing incoherent and coherent light sources.

FIGS. 7A and 7B illustrate a cross section of the screen 110 (shown in FIG. 1) taken along the line AA'. As can be appreciated from inspection of FIGS. 7A and 7B, a reduced speckling effect that may occur as a result of combining the incoherent and coherent light sources 405 and 410. The cross section of the screen 110 shown in FIG. 7A illustrates the situation where only the red (R), green (G), and blue (B) coherent light sources 426, 427, and 428 are applied to the screen 110. Because the screen 110 contains surface imperfections (shown in FIG. 7A as a rough surface and specifically the wavy line), the collimated light emanating from the coherent light sources 426, 427, and 428 may be reflected off the surface imperfections and result in speckling or visual imperfections in the projected image. The cross section of the screen 110 shown in FIG. 7B illustrates the situation where the R, G, and B, coherent light sources 426, 427, and 428 are applied to the screen 110 in conjunction with the R', G', and B' incoherent light sources 406, 407, and 408. This arrangement may reduce the overall speckling of the image by presenting the observer with a dithered version of each of the light sources—i.e., the average of R and R', G and G', and B and B' respectively. Thus, in addition to reducing the power level by operating the incoherent and coherent light sources 405 and 410 in concert with each other, speckling may be reduced by operating the coherent light source 410 in concert with the incoherent light source 405.

Figure 8:
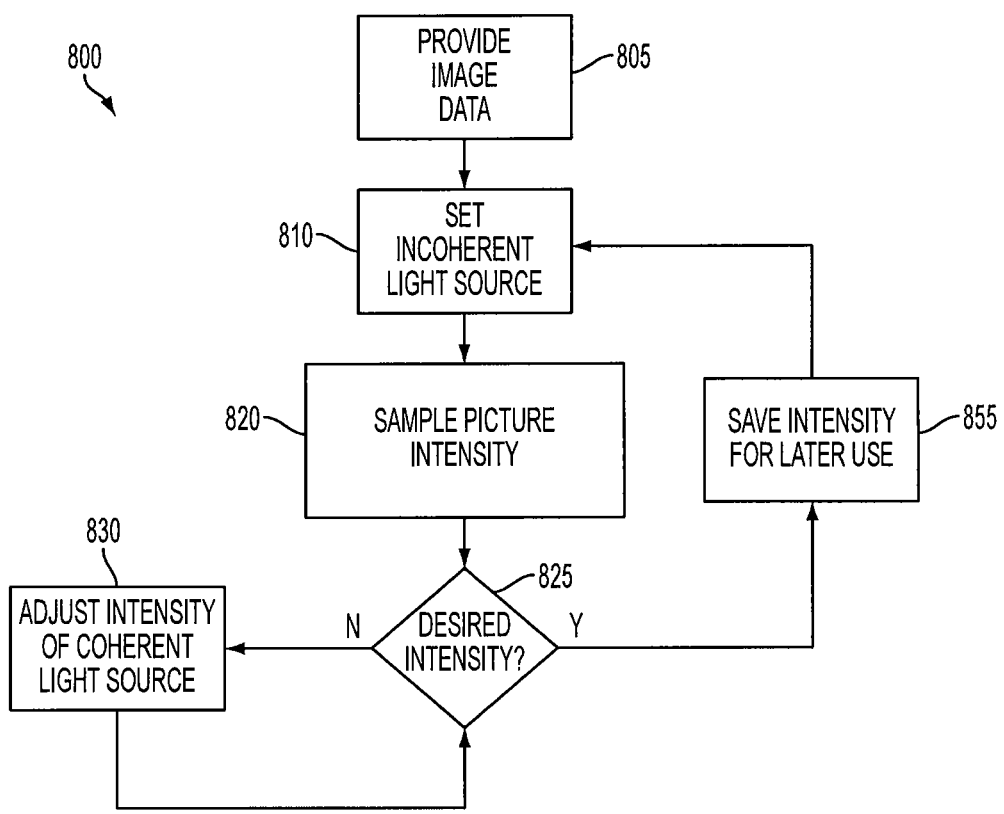
FIG. 8 illustrates operations for calibrating the coherent light source.

Because the images on the screen 110 are a combination of the incoherent and coherent light sources 405 and 410, in some embodiments, the microprocessor 402 may be used to calibrate the contribution of the coherent light source 410 so that this calibration can be used later during operation. FIG. 8 illustrates operations 800 for calibrating the coherent light source 410. In operation 805, the microprocessor 402 may receive video data from the video source 115. The microprocessor 402 may process this video data and determine the baseline level for the incoherent light source 405 (e.g., the baseline shown in FIG. 5). The incoherent light source 405 may be set according to this baseline level in operation 810.

Referring to FIG. 4 in conjunction with FIG. 8, a light sensor 815 (shown in FIG. 4) may sample the intensity of the image being projected onto the screen 110. In some embodiments, this sampling may occur at various locations on the screen 110. This sampling is illustrated in FIG. 8 as operation 820. During operation 825, the sampled intensity may be compared to the desired baseline set by the microprocessor 402. Initially, the intensity of the coherent light source 410 is zero and thus control may flow to operation 830 where the coherent light source 410 may be adjusted. After the adjustment operation 830, control may flow back to operation 825 to determine if the adjustment made during operation 830 was adequate to achieve the desired intensity level.

If operation 825 determines that the desired intensity level of the coherent light source 410 was achieved during the adjustment of operation 830, then control may flow to operation 835, where the value of the intensity may be saved by the microprocessor 402 as a calibration point for later use during operation, and control subsequently may flow back to operation 810 to set the incoherent light source 405 to the next intensity value.

On the other hand, if operation 825 determines that the desired intensity level of the coherent light source 410 was not achieved during the adjustment operation 830, then control may flow back to operation 830 for another adjustment. This back-and-forth between operations 825 and 830 may continue until the desired intensity for the coherent light source 410 is achieved, then control may flow to operations 825 and 810 to save this intensity level of the coherent light source 410 as a calibration point and control may subsequently flow back to operation 810 to set incoherent light source 405 to the next intensity value.

What is claimed is:

1. A system for displaying images comprising:
   an incoherent light source; and
   a coherent light source operating in concert with the incoherent light source to produce a combined beam of light, wherein the combined light beam includes similar wavelength contributions from the incoherent and coherent light sources, wherein the coherent light source emanates a narrower band of wavelengths as compared to the incoherent light source, wherein an intensity level of the coherent light source is less than an intensity level of the incoherent light source, and wherein the intensity level of the coherent light source is used to fine tune an overall intensity of the combined beam of light.

2. A system for displaying images comprising:
   an incoherent light source; and
   a coherent light source operating in concert with the incoherent light source to produce a combined beam of light, wherein the combined light beam includes similar wavelength contributions from the incoherent and coherent light sources, wherein the coherent light source emanates a narrower band of wavelengths as compared to the incoherent light source, wherein an intensity level of the coherent light source is less than an intensity level of the incoherent light source, the system further comprising a light sensor.

3. The system of claim 2, wherein the intensity level of the incoherent light source is used to calibrate the intensity level of the coherent light source.

4. A system for displaying images comprising:
   an incoherent light source; and
   a coherent light source operating in concert with the incoherent light source to produce a combined beam of light, wherein the combined light beam includes similar wavelength contributions from the incoherent and coherent light sources, wherein the coherent light source emanates a narrower band of wavelengths as compared to the incoherent light source, wherein the incoherent light source is driven by a chrominance portion of a video signal.

5. A system for displaying images comprising:

an incoherent light source; and a coherent light source operating in concert with the incoherent light source to produce a combined beam of light, wherein the combined light beam includes similar wavelength contributions from the incoherent and coherent light sources, wherein the coherent light source emanates a narrower band of wavelengths as compared to the incoherent light source, wherein the coherent light source is driven by a luminance portion of a video signal.

6. A method of displaying images, comprising the operations of:

outputting a first light from an incoherent light source;

outputting a second light from a coherent light source operating in concert with the incoherent light source, thereby producing a combined beam of light including similar wavelength contributions from the incoherent and coherent light sources; and using the intensity level of the incoherent light source to calibrate the intensity level of the coherent light source.

7. The method of claim 6, further comprising setting an intensity level of the coherent light source to be less than an intensity level of the incoherent light source.

8. A method of displaying images, comprising the operations of:

outputting a first light from an incoherent light source;

outputting a second light from a coherent light source operating in concert with the incoherent light source, thereby producing a combined beam of light including similar wavelength contributions from the incoherent and coherent light sources;

determining a chrominance of a projected image;

determining a luminance of the projected image;

setting the output of the incoherent light source based on the chrominance of the projected image; and setting the output of the coherent light source based on the luminance of the projected image.

* * * * *